(12) United States Patent
Maruyama

(10) Patent No.: US 12,521,330 B2
(45) Date of Patent: Jan. 13, 2026

(54) COMPOSITION COMPRISING TWO POLYGLYCERYL FATTY ACID ESTERS

(71) Applicant: L'OREAL, Paris (FR)

(72) Inventor: Kazuhiko Maruyama, Kanagawa (JP)

(73) Assignee: L'OREAL, Paris (FR)

( * ) Notice: Subject to any disclaimer, the term of this patent is extended or adjusted under 35 U.S.C. 154(b) by 914 days.

(21) Appl. No.: 17/299,300

(22) PCT Filed: Nov. 27, 2019

(86) PCT No.: PCT/JP2019/047303
§ 371 (c)(1),
(2) Date: Jun. 2, 2021

(87) PCT Pub. No.: WO2020/116480
PCT Pub. Date: Jun. 11, 2020

(65) Prior Publication Data
US 2022/0047477 A1    Feb. 17, 2022

(30) Foreign Application Priority Data

Dec. 7, 2018  (JP) .................................. 2018-229893

(51) Int. Cl.
*A61K 8/37*     (2006.01)
*A61K 8/92*     (2006.01)
*A61Q 1/14*     (2006.01)

(52) U.S. Cl.
CPC .............. *A61K 8/375* (2013.01); *A61K 8/922* (2013.01); *A61Q 1/14* (2013.01)

(58) Field of Classification Search
CPC .......... A61K 8/375; A61K 8/922; A61K 8/31; A61K 8/342; A61K 8/37; A61K 8/39; A61K 8/92; A61Q 1/14; A61Q 3/04
See application file for complete search history.

(56) References Cited

U.S. PATENT DOCUMENTS

2016/0279050 A1* 9/2016 Lu .......................... A61Q 19/00

FOREIGN PATENT DOCUMENTS

| EP | 3308766 A1 | 4/2018 | |
|----|------------|--------|--|
| JP | 2018016613 A | 2/2018 | |
| WO | 2014/098265 A1 | 6/2014 | |
| WO | 2014/098266 A1 | 6/2014 | |
| WO | 2014/098268 A1 | 6/2014 | |
| WO | 2015/198922 A1 | 12/2015 | |
| WO | WO-2015198922 A * | 12/2015 | ........... A61K 8/0295 |
| WO | 2019/044529 A1 | 3/2019 | |
| WO | 2019/168193 A1 | 9/2019 | |
| WO | 2019/198426 A1 | 10/2019 | |

OTHER PUBLICATIONS

Mintel, Database GNPD [Online] Mintel; Mar. 21, 2014, "Anti-Shine Fresh Cleansing Oil" XP055670637 (Year: 2014).*
PCT, International Search Report for the corresponding patent application No. PCT/JP2019/047303, dated Mar. 9, 2020.
Database GNPD [Online] Mintel; Mar. 21, 2014, anonymous: Anti-Shine Fresh Cleansing Oil, XP055670637, retrieved from www.gnpd.com, Database accession No. 2343053.
Database GNPD [Online] Mintel; Mar. 11, 2016, anonymous: Cleansing Oil Ex, XP055670658, retrieved from www.gnpd.com, Database accession No. 3862709.
Database GNPD [Online] Mintel; Nov. 30, 2015, anonymous: Shampoo, XP055670669, retrieved from www.gnpd.com, Database accession No. 3591453.
Database GNPD [Online] Mintel; Sep. 22, 2015, anonymous: The Cleansing Oil, XP055670677, retrieved from www.gnpd.com, Database accession No. 3392411.
Database GNPD [Online] Mintel; Jun. 14, 2011, anonymous: Cleansing Cream, XP055670688, retrieved from www.gnpd.com, Database accession No. 1573445.
Database GNPD [Online] Mintel; Dec. 22, 2009, anonymous: Certified Organic Shampoo Shower Gel, XP055670694, retrieved from www.gnpd.com, Database accession No. 1237575.
Database GNPD [Online] Mintel; Apr. 9, 2018, anonymous: Cleansing Oil, XP055670704, retrieved from www.gnpd.com, Database accession No. 5555993.
JPO, Notice of Allowance, mailed Mar. 6, 2023, for the related Japanese Patent Application No. 2018-229893, and English translation thereof, 5 pages.

* cited by examiner

*Primary Examiner* — Susanna Moore
*Assistant Examiner* — Luisalberto Gonzalez
(74) *Attorney, Agent, or Firm* — LUCAS & MERCANTI, LLP

(57) ABSTRACT

The present invention relates to a composition, preferably a cosmetic composition, and more preferably a cleansing composition, comprising: (a) at least one polyglyceryl fatty acid diester and/or at least one polyglyceryl fatty acid triester; (b) at least one polyglyceryl fatty acid monoester; and (c) at least one oil, wherein the ingredients (a) and (b) comprise a fatty acid moiety with 6 to 22 carbon atoms, preferably 7 to 20 carbon atoms, and more preferably 8 to 18 carbon atoms, and 10 or less glycerol units, preferably 8 or less, and more preferably 6 or less, and the average HLB value of the ingredients (a) and (b) ranges from 8.0 to 11.0, preferably from 8.5 to 10.5, and more preferably from 9.0 to 10.0. The composition according to the present invention is stable and can provide sufficient makeup removability and a comfortable feeling just after being rinsed off.

12 Claims, No Drawings

COMPOSITION COMPRISING TWO POLYGLYCERYL FATTY ACID ESTERS

CROSS REFERENCE TO RELATED APPLICATION

This Application is a 371 of PCT/JP2019/047303 filed on Nov. 27, 2019 which, in turn, claimed the priority of Japanese Patent Application No. 2018-229893 filed on Dec. 7, 2018, both applications are incorporated herein by reference.

TECHNICAL FIELD

The present invention relates to a composition, preferably a cosmetic composition, and more preferably a cleansing cosmetic composition, which comprises two different types of polyglyceryl fatty acid esters.

BACKGROUND ART

In recent years, environmental problems have escalated, and therefore, efforts to reduce environmental risk are becoming necessary.

There are many cosmetic products containing various type of surfactants having the possibility of causing environmental pollution and destruction. Some cosmetic products such as hair shampoo, hair conditioner, body soap, facial cleanser, and makeup remover are rinsed off and discharged to rivers or oceans every day. Accordingly, cosmetic products containing biodegradable surfactants are required to reduce environmental risk.

A cleansing cosmetic product such as a makeup remover is one such rinse-off product and is well known for containing a certain level of nonionic surfactants such as polyethyleneglycol (PEG)-based surfactants which are mostly not biodegradable. Also, depending on the manufacturing process, PEGs may be contaminated with measurable amounts of 1,4-dioxane which may be persistent. In other words, it does not degrade easily and can remain in the environment for a long time after being discharged to the environment. This means that, for cleansing cosmetic products including PEG-based surfactants, there is some possibility of causing environmental pollution and destruction.

On the other hand, polyglycerol fatty acid esters (PGFEs) are also used as surfactants in cleansing cosmetic products. PGEFs are preferable for environmental reasons because they are biodegradable as compared to PEG-based surfactants.

DISCLOSURE OF INVENTION

It has been found that if the length of polyglycerol units of PGFEs is too long (e.g., the polymerization degree of the polyglycerol is greater than or equal to 10), the biodegradability of the PGEFs may be very diminished. Therefore, it would be preferable to use PGFEs with shorter glycerol units (less than 10 glycerol units) in terms of biodegradability.

However, it has also been found that cleansing cosmetic products including PGFEs with less than 10 glycerol units, as surfactants, may not be stable or may not be able to provide sufficient makeup removability or a comfortable feeling just after being rinsed off due to the lower hydrophilic property of such PGFEs.

On the other hand, cleansing cosmetic products containing PGFEs with 10 or more glycerol units, as surfactants, can generally provide sufficient makeup removability as well as a refreshed feeling just after being rinsed off due to the higher hydrophilic property of such PGFEs.

Therefore, it is desired to provide a stable cleansing composition which comprises a highly biodegradable surfactant with a low environmental risk, and can provide sufficient makeup removability and a comfortable feeling just after being rinsed off, such as a refreshed feeling.

An objective of the present invention is to provide a stable composition which includes a polyglyceryl fatty acid ester with less than 10 glycerol units, for high biodegradability, and can provide sufficient makeup removability and a comfortable feeling just after being rinsed off.

The above objective of the present invention can be achieved by a composition, preferably a cosmetic composition, and more preferably a cleansing composition, comprising:

(a) at least one polyglyceryl fatty acid diester and/or at least one polyglyceryl fatty acid triester;
(b) at least one polyglyceryl fatty acid monoester; and
(c) at least one oil,
wherein
the ingredients (a) and (b) comprise
 a fatty acid moiety with 6 to 22 carbon atoms, preferably 7 to 20 carbon atoms, and more preferably 8 to 18 carbon atoms, and
 less than 10 glycerol units, preferably 8 or less, and more preferably 6 or less,
and
the average HLB value of the ingredients (a) and (b) ranges from 8.0 to 11.0, preferably from 8.5 to 10.5, and more preferably from 9.0 to 10.0.

It is preferable that the weight ratio of the amount of the ingredient (b)/the amount of the ingredient (a) be 0.6 or less, preferably 0.5 or less, and more preferably 0.45 or less.

The weight ratio of the amount of the ingredient (b)/the amount of the ingredient (a) may be 0.10 or more, preferably 0.15 or more, and more preferably 0.20 or more.

The ingredient (a) may be selected from the group consisting of PG-6 dioleate, PG-6 dicaprate, PG-6 tricaprylate, and mixtures thereof.

The amount of the ingredient (a) in the composition according to the present invention may range from 0.01% to 20% by weight, preferably from 0.1% to 15% by weight, and more preferably from 1% to 10% by weight, relative to the total weight of the composition.

The ingredient (b) may be selected from the group consisting of PG-2 oleate, PG-6 caprylate, PG-5 laurate, PG-5 oleate, PG-2 caprate, and mixtures thereof.

The amount of the ingredient (b) in the composition according to the present invention may range from 0.01% to 20% by weight, preferably from 0.1% to 15% by weight, and more preferably from 1% to 10% by weight, relative to the total weight of the composition.

The ingredient (c) may be selected from ester oils, artificial or natural triglycerides, fatty alcohols, and mixtures thereof.

The amount of the ingredient (c) in the composition according to the present invention may range from 50% to 98% by weight, preferably from 60% to 95% by weight, and more preferably from 70% to 90% by weight, relative to the total weight of the composition.

The composition according to the present invention may be anhydrous or may comprise water in an amount of less than 5% by weight, preferably less than 3% by weight, and more preferably less than 1% by weight, relative to the total weight of the composition.

The composition according to the present invention may comprise no polyglyceryl fatty acid ester having 10 or more glycerol units, or may comprise polyglyceryl fatty acid ester having 10 or more glycerol units in an amount of less than 5% by weight, preferably less than 3% by weight, and more preferably less than 1% by weight, relative to the total weight of the composition.

The composition according to the present invention may comprise no surfactant having at least one polyoxyethylene unit or may comprise a surfactant having at least one polyoxyethylene unit in an amount of less than 5% by weight, preferably less than 3% by weight, and more preferably less than 1% by weight, relative to the total weight of the composition.

It is preferable that the composition according to the present invention be intended for removing makeup from a keratin substance.

The present invention also relates to a cosmetic process for treating a keratin substance, comprising the step of applying the composition according to the present invention to the keratin substance.

The above process may further comprise the step of rinsing off the composition from the keratin substance, wherein the process is intended for removing makeup from the keratin substance.

BEST MODE FOR CARRYING OUT THE INVENTION

After diligent research, the inventors have discovered that it is possible to provide a stable composition which includes a polyglyceryl fatty acid ester with less than 10 glycerol units, for high biodegradability, and can provide sufficient makeup removability and a comfortable feeling just after being rinsed off.

It has now been discovered, surprisingly, that the use of a combination of (a) at least one polyglycerol fatty acid diester and/or at least one polyglyceryl fatty acid triester, wherein the ingredient (a) comprises a fatty acid moiety with 6 to 22 carbon atoms, preferably 7 to 20 carbon atoms, and more preferably 8 to 18 carbon atoms, and less than 10 glycerol units, preferably 8 or less, and more preferably 6 or less, and (b) at least one polyglycerol fatty acid monoester, wherein the ingredient (b) comprises a fatty acid moiety with 6 to 22 carbon atoms, preferably 7 to 20 carbon atoms, and more preferably 8 to 18 carbon atoms, and less than 10 glycerol units, preferably 8 or less, and more preferably 6 or less in a composition including (c) at least one oil under the condition that the average HLB value of the ingredients (a) and (b) is from 8.0 to 11.0, preferably from 8.5 to 10.5, and more preferably from 9.0 to 10.0 can improve at least one, preferably all, of the makeup removability of the composition, the feeling (skin finish) after using the composition (especially just after being used), and the stability of the composition.

Thus, the composition according to the present invention comprises:

(a) at least one polyglyceryl fatty acid diester and/or at least one polyglyceryl fatty acid triester;
(b) at least one polyglyceryl fatty acid monoester; and
(c) at least one oil, wherein the ingredients (a) and (b) comprise
a fatty acid moiety with 6 to 22 carbon atoms, preferably 7 to 20 carbon atoms, and more preferably 8 to 18 carbon atoms, and
less than 10 glycerol units, preferably 8 or less, and more preferably 6 or less, and the average HLB value of the ingredients (a) and (b) ranges from 8.0 to 11.0, preferably from 8.5 to 10.5, and more preferably from 9.0 to 10.0.

The composition according to the present invention has a low environmental risk because both the ingredients (a) and (b) are highly biodegradable.

The composition according to the present invention is stable and can provide sufficient makeup removability and a comfortable feeling just after being rinsed off.

If the weight ratio of the amount of the ingredient (b)/the amount of the ingredient (a) in the composition according to the present invention is 0.6 or less, preferably 0.5 or less, and more preferably 0.4 or less, the composition according to the present invention can provide good makeup removability even under wet conditions such as those in a bathroom.

If the composition according to the present invention comprises no polyglyceryl fatty acid ester having 10 or more glycerol units, or may comprise a polyglyceryl fatty acid ester having 10 or more glycerol units in an amount of less than 5% by weight, preferably less than 3% by weight, more preferably less than 1% by weight, and even more preferably less than 0.1% by weight, relative to the total weight of the composition, the composition can further reduce environmental risk because the polyglyceryl fatty acid ester having 10 or more glycerol units is less biodegradable.

If the composition according to the present invention comprises no surfactant having at least one polyoxyethylene unit or may comprise a surfactant having at least one polyoxyethylene unit in an amount of less than 5% by weight, preferably less than 3% by weight, more preferably less than 1% by weight, and even more preferably less than 0.1% by weight, relative to the total weight of the composition, the composition can further reduce environmental risk because a surfactant having at least one polyoxyethylene unit is, in general, not biodegradable. Also, the risk of discharging 1,4-dioxane to the environment can also be reduced.

Here, "high biodegradability" or "highly biodegradable" means a biodegradability classified as "readily biodegradable" in accordance with the testing methodology according to OECD 301B or 301C, preferably OECD 301C.

Hereinafter, the composition according to the present invention will be explained in a more detailed manner.

[Polyglyceryl Fatty Acid Diester or Triester]

The composition according to the present invention comprises (a) at least one polyglyceryl fatty acid diester and/or at least one polyglyceryl fatty acid triester (referred to as ingredient (a)). A single type of polyglyceryl fatty acid diester or triester may be used, but two or more different types of polyglyceryl fatty acid diester or triester may be used in combination.

The ingredient (a) may be
either at least one polyglyceryl fatty acid diester or at least one polyglyceryl fatty acid triester, or
a combination of two or more polyglyceryl fatty acid diesters, a combination of two or more polyglyceryl fatty acid triesters, or a combination of at least one polyglyceryl fatty acid diester and at least one polyglyceryl fatty acid triester.

The ingredient (a) can function as a surfactant, in particular a nonionic surfactant.

The ingredient (a) comprises
a fatty acid moiety with 6 to 22 carbon atoms, preferably 7 to 20 carbon atoms, and more preferably 6 to 18 carbon atoms, and
less than 10 glycerol units, preferably 8 or less, and more preferably 6 or less.

The ingredient (a) (polyglyceryl fatty acid diester or triester) has two or three fatty acid moieties. The fatty acid moiety may be the same or different.

The fatty acid moiety may be derived from a saturated or unsaturated fatty acid. Thus, the ingredient (a) may be selected from polyglyceryl saturated or unsaturated fatty acid diesters and polyglyceryl saturated or unsaturated fatty acid triesters.

The fatty acid for the fatty acid moiety of the ingredient (a) may be saturated or unsaturated, and may be selected from lauric acid, myristic acid, stearic acid, isostearic acid, oleic acid, capric acid and caprylic acid.

The number of glycerol units in the ingredient (a) is two or more, and may be 4 or more, preferably 5 or more, and more preferably 6 or more.

It may be preferable that the ingredient (a) comprise from 2 to 8 glycerol units, more preferably from 2 to 6 glycerol units, and even more preferably from 4 to 6 glycerol units.

The ingredient (a) may have an HLB value of 3.0 to 13.0, preferably 6.0 to 12.0, and more preferably 9.0 to 11.0.

The term HLB ("hydrophilic-lipophilic balance") is well known to those skilled in the art, and reflects the ratio between the hydrophilic part and the lipophilic part in the molecule. HLB values can be calculated with the formula HLB=20*(1−S/A), where S is the saponification number of the ester and A is the neutralization number of the fatty acid.

The ingredient (a) may be selected from the group consisting of PG-2 distearate (HLB: 4), PG-2 diisostearate (HLB: 3.2), PG-3 distearate (HLB: 5), PG-3 diisostearate (HLB: 5), PG-3 dicocoate (HLB: 7), PG-5 trioleate (HLB: 7.0), PG-6 distearate (HLB: 8), PG-6 dioleate (HLB: 9.8), PG-6 dicaprate (HLB: 10.2), PG-6 tricaprylate (HLB: 10.6) and mixtures thereof.

It may be preferable that the ingredient (a) be selected from the group consisting of PG-6 dioleate (HLB: 9.8), PG-6 dicaprate (HLB: 10.2), PG-6 tricaprylate (HLB: 10.6), and mixtures thereof.

The amount of the ingredient (a) in the composition according to the present invention may be 0.01% by weight or more, preferably 0.1% by weight or more, and more preferably 1% by weight or more, relative to the total weight of the composition.

On the other hand, the amount of the ingredient (a) in the composition according to the present invention may be 20% by weight or less, preferably 15% by weight or less, and more preferably 10% by weight or less, relative to the total weight of the composition.

The amount of the ingredient (a) in the composition according to the present invention may range from 0.01% to 20% by weight, preferably from 0.1% to 15% by weight, more preferably from 1% to 10% by weight, relative to the total weight of the composition.

The weight ratio of the amount of the ingredient (a)/the amount of the (c) oil(s) in the composition according to the present invention may range from 0.01 to 0.3, preferably from 0.02 to 0.2, and more preferably from 0.03 to 0.1.

[Polyglyceryl Fatty Acid Monoester]

The composition according to the present invention comprises (b) at least one polyglyceryl fatty acid monoester (referred to as ingredient (b)). A single type of (b) polyglyceryl fatty acid monoester may be used, but two or more different types of (b) polyglyceryl fatty acid monoester may be used in combination.

The ingredient (b) can function as a surfactant, in particular a nonionic surfactant.

The ingredient (b) comprises
a fatty acid moiety with 6 to 22 carbon atoms, preferably 7 to 20 carbon atoms, and more preferably 6 to 18 carbon atoms, and
less than 10 glycerol units, preferably 8 or less, and more preferably 6 or less.

The ingredient (b) has one fatty acid moiety.

The fatty acid moiety may be derived from a saturated or unsaturated fatty acid. Thus, the ingredient (b) may be selected from polyglyceryl saturated or unsaturated fatty acid monoesters.

The fatty acid for the fatty acid moiety of the ingredient (b) may be saturated or unsaturated, and may be selected from lauric acid, myristic acid, stearic acid, isostearic acid, oleic acid, capric acid and caprylic acid.

The number of glycerol units in the ingredient (b) is two or more, and may be 4 or more, preferably 5 or more, and more preferably 6 or more.

It may be preferable that the ingredient (b) comprises from 2 to 8 glycerol units, more preferably from 2 to 6 glycerol units, and even more preferably from 2 to 6 glycerol units.

The ingredient (b) may have an HLB value of 4.0 to 17.0, preferably 5.0 to 16.0, and more preferably 6.0 to 15.0.

The term HLB ("hydrophilic-lipophilic balance") is well known to those skilled in the art, and reflects the ratio between the hydrophilic part and the lipophilic part in the molecule.

The ingredient (b) may be selected from the group consisting of PG-2 stearate (HLB: 5.0), PG-2 isostearate (HLB: 4.7), PG-2 oleate (HLB: 7.2), PG-2 caprate (HLB: 9.5), PG-2 laurate (HLB: 8.5), PG-4 oleate (HLB: 8.8), PG-4 laurate (HLB: 10.3), PG-4 isostearate (HLB: 8.2), PG-5 laurate (HLB: 10.9), PG-6 isostearate (HLB: 10.8), PG-3 cocoate (HLB: 12), PG-3 caprate (HLB: about 14), PG-4 caprylate (HLB: 14), PG-4 caprate (HLB: about 15), PG-5 myristate (HLB: 15.4), PG-5 stearate (HLB: 15), PG-5 oleate (HLB: 12.7), PG-6 caprylate (HLB: 14.6), PG-6 caprate (HLB: 13.1), PG-6 laurate (HLB: 14.1), and mixtures thereof.

It may be preferable that the ingredient (b) be selected from the group consisting of PG-2 oleate (HLB: 7.2), PG-6 caprylate (HLB: 14.6), PG-5 laurate (HLB: 10.9), PG-5 oleate (HLB: 12.7), PG-2 caprate (HLB: 9.5), and mixtures thereof.

The amount of the ingredient (b) in the composition according to the present invention may be 0.01% by weight or more, preferably 0.1% by weight or more, and more preferably 1% by weight or more, relative to the total weight of the composition.

On the other hand, the amount of the ingredient (b) in the composition according to the present invention may be 20% by weight or less, preferably 15% by weight or less, and more preferably 10% by weight or less, relative to the total weight of the composition.

The amount of the ingredient (b) in the composition according to the present invention may range from 0.01% to 20% by weight, preferably from 0.1% to 15% by weight, more preferably from 1% to 10% by weight, relative to the total weight of the composition.

The weight ratio of the amount of the ingredient (b)/the amount of the (c) oil(s) in the composition according to the present invention may range from 0.001 to 0.1, preferably from 0.005 to 0.08, and more preferably from 0.01 to 0.06.

[Average HLB of Polyglyceryl Fatty Acid Esters]

According to the present invention, the average HLB value of the ingredients (a) and (b) is from 8.0 to 11.0, preferably from 8.5 to 10.5, and more preferably from 9.0 to 10.0. The term "average" HLB value here means a weight average HLB value.

If the average HLB value is less than 8.0, the feeling after being rinsed off, provided by the composition according to the present invention, becomes greasy or tacky (not a refreshed feeling). If the average HLB value is more than 11.0, the stability of the composition according to the present invention becomes worse.

[Weight Ratio of Polyglyceryl Fatty Acid Esters]

The weight ratio of the amount of the ingredient (b)/the amount of the ingredient (a) in the composition according to the present invention may be 0.6 or less, preferably 0.5 or less, and more preferably 0.45 or less.

The weight ratio of the amount of the ingredient (b)/the amount of the ingredient (a) in the composition according to the present invention may be 0.10 or more, preferably 0.15 or more, and more preferably 0.20 or more.

The weight ratio of the amount of the ingredient (b)/the amount of the ingredient (a) in the composition according to the present invention may be from 0.10 to 0.6, preferably from 0.15 to 0.5, and more preferably from 0.20 to 0.45.

The weight ratio of the amount of the ingredient (a)/the total amount of the ingredients (a) and (b) in the composition according to the present invention may be 0.9 or less, preferably 0.85 or less, and more preferably 0.8 or less.

The weight ratio of the amount of the ingredient (a)/the total amount of the ingredients (a) and (b) in the composition according to the present invention may be 0.5 or more, preferably 0.55 or more, and more preferably 0.6 or more.

The weight ratio of the amount of the ingredient (a)/the total amount of the ingredients (a) and (b) in the composition according to the present invention may be from 0.5 to 0.9, preferably from 0.55 to 0.85, and more preferably from 0.6 to 0.8.

The weight ratio of the amount of the ingredient (b)/the total amount of the ingredients (a) and (b) in the composition according to the present invention may be 0.5 or less, preferably 0.45 or less, and more preferably 0.4 or less.

The weight ratio of the amount of the ingredient (b)/the total amount of the ingredients (a) and (b) in the composition according to the present invention may be 0.1 or more, preferably 0.15 or more, and more preferably 0.2 or more.

The weight ratio of the amount of the ingredient (b)/the total amount of the ingredients (a) and (b) in the composition according to the present invention may be from 0.1 to 0.5, preferably from 0.15 to 0.45, and more preferably from 0.2 to 0.4.

[Total Amount of Polyglyceryl Fatty Acid Esters]

The total amount of the ingredients (a) and (b) in the composition according to the present invention may be 25% by weight or less, preferably 20% by weight or less, and more preferably 15% by weight or less, relative to the total weight of the composition.

The total amount of the ingredients (a) and (b) in the composition according to the present invention may be 1% by weight or more, preferably 3% by weight or more, and more preferably 5% by weight or more, relative to the total weight of the composition.

The total amount of the ingredients (a) and (b) in the composition according to the present invention may range from 1% to 25% by weight, preferably from 3% to 20% by weight, and more preferably from 5% to 15% by weight, relative to the total weight of the composition.

[Oil]

The composition according to the present invention comprises (c) at least one oil (referred to as ingredient (c)). A single type of oil may be used, but two or more different types of oils may be used in combination.

Here, "oil" means a fatty compound or substance which is in the form of a liquid or a paste (non-solid) at room temperature (25° C.) under atmospheric pressure (1 atm). As the oils, those generally used in cosmetics can be used alone or in combination thereof. These oils may be volatile or non-volatile.

The oil may be a non-polar oil such as a hydrocarbon oil, a silicone oil, or the like; a polar oil such as a plant or animal oil and an ester oil or an ether oil; or a mixture thereof.

The oil may be selected from the group consisting of oils of plant or animal origin, synthetic oils, silicone oils, hydrocarbon oils and fatty alcohols.

As examples of plant oils, mention may be made of, for example, linseed oil, camellia oil, *Macadamia* nut oil, corn oil, mink oil, olive oil, avocado oil, sasanqua oil, castor oil, safflower oil, *jojoba* oil, sunflower oil, almond oil, rapeseed oil, sesame oil, soybean oil, peanut oil, and mixtures thereof.

As examples of animal oils, mention may be made of, for example, squalene and squalane.

As examples of synthetic oils, mention may be made of alkane oils such as isododecane and isohexadecane, ester oils, ether oils, and artificial triglycerides.

The ester oils are preferably liquid esters of saturated or unsaturated, linear or branched $C_1$-$C_{26}$ aliphatic monoacids or polyacids and of saturated or unsaturated, linear or branched $C_1$-$C_{26}$ aliphatic monoalcohols or polyalcohols, the total number of carbon atoms of the esters being greater than or equal to 10.

Preferably, for the esters of monoalcohols, at least one from among the alcohol and the acid from which the esters of the present invention are derived is branched.

Among the monoesters of monoacids and of monoalcohols, mention may be made of ethyl palmitate, ethyl hexyl palmitate, isopropyl palmitate, dicaprylyl carbonate, alkyl myristates such as isopropyl myristate or ethyl myristate, isocetyl stearate, 2-ethylhexyl isononanoate, isononyl isononanoate, isodecyl neopentanoate and isostearyl neopentanoate.

Esters of $C_4$-$C_{22}$ dicarboxylic or tricarboxylic acids and of $C_1$-$C_{22}$ alcohols, and esters of monocarboxylic, dicarboxylic or tricarboxylic acids and of non-sugar $C_4$-$C_{26}$ dihydroxy, trihydroxy, tetrahydroxy or pentahydroxy alcohols may also be used.

Mention may especially be made of: diethyl sebacate; isopropyl lauroyl sarcosinate; diisopropyl sebacate; bis(2-ethylhexyl) sebacate; diisopropyl adipate; di-n-propyl adipate; dioctyl adipate; bis(2-ethylhexyl) adipate; diisostearyl adipate; bis(2-ethylhexyl) maleate; triisopropyl citrate; triisocetyl citrate; triisostearyl citrate; glyceryl trilactate; glyceryl trioctanoate; trioctyldodecyl citrate; trioleyl citrate; neopentyl glycol diheptanoate; diethylene glycol diisononanoate.

As ester oils, one can use sugar esters and diesters of $C_6$-$C_{30}$ and preferably $C_{12}$-$C_{22}$ fatty acids. It is recalled that the term "sugar" means oxygen-bearing hydrocarbon-based compounds containing several alcohol functions, with or without aldehyde or ketone functions, and which comprise at least 4 carbon atoms. These sugars may be monosaccharides, oligosaccharides or polysaccharides.

Examples of suitable sugars that may be mentioned include sucrose (or saccharose), glucose, galactose, ribose, fucose, maltose, fructose, mannose, arabinose, xylose and lactose, and derivatives thereof, especially alkyl derivatives, such as methyl derivatives, for instance methylglucose.

The sugar esters of fatty acids may be chosen especially from the group comprising the esters or mixtures of esters of sugars described previously and of linear or branched, saturated or unsaturated $C_6$-$C_{30}$ and preferably $C_{12}$-$C_{22}$ fatty acids. If they are unsaturated, these compounds may have one to three conjugated or non-conjugated carbon-carbon double bonds.

The esters according to this variant may also be selected from monoesters, diesters, triesters, tetraesters and polyesters, and mixtures thereof.

These esters may be, for example, oleates, laurates, palmitates, myristates, behenates, cocoates, stearates, linoleates, linolenates, caprates and arachidonates, or mixtures thereof such as, especially, oleopalmitate, oleostearate and palmitostearate mixed esters, as well as pentaerythrityl tetraethyl hexanoate.

More particularly, use is made of monoesters and diesters and especially sucrose, glucose or methylglucose monooleates or dioleates, stearates, behenates, oleopalmitates, linoleates, linolenates and oleostearates.

An example that may be mentioned is the product sold under the name Glucate® DO by the company Amerchol, which is a methylglucose dioleate.

As examples of preferable ester oils, mention may be made of, for example, diisopropyl adipate, dioctyl adipate, 2-ethylhexyl hexanoate, ethyl laurate, cetyl octanoate, octyldodecyl octanoate, octyldodecyl myristate, isodecyl neopentanoate, myristyl propionate, 2-ethylhexyl 2-ethylhexanoate, 2-ethylhexyl octanoate, 2-ethylhexyl caprylate/caprate, methyl palmitate, ethyl palmitate, isopropyl palmitate, dicaprylyl carbonate, isopropyl lauroyl sarcosinate, isononyl isononanoate, ethylhexyl palmitate, isohexyl laurate, hexyl laurate, isocetyl stearate, isopropyl isostearate, isopropyl myristate, isodecyl oleate, glyceryl tri(2-ethylhexanoate), pentaerythrityl tetra(2-ethylhexanoate), 2-ethylhexyl succinate, diethyl sebacate, ethylhexyl stearate, and mixtures thereof.

As examples of artificial triglycerides, mention may be made of, for example, capryl caprylyl glycerides, glyceryl trimyristate, glyceryl tripalmitate, glyceryl trilinolenate, glyceryl trilaurate, glyceryl tricaprate, caprylic/capric/succinic triglyceride, glyceryl tricaprylate, glyceryl tri(caprate/caprylate) and glyceryl tri(caprate/caprylate/linolenate).

As examples of silicone oils, mention may be made of, for example, linear organopolysiloxanes such as dimethylpolysiloxane, methylphenylpolysiloxane, methylhydrogenpolysiloxane, and the like; cyclic organopolysiloxanes such as octamethylcyclotetrasiloxane, decamethylcyclopentasiloxane, dodecamethylcyclohexasiloxane, and the like; and mixtures thereof.

Preferably, silicone oil is chosen from liquid polydialkylsiloxanes, especially liquid polydimethylsiloxanes (PDMS) and liquid polyorganosiloxanes comprising at least one aryl group.

These silicone oils may also be organomodified. The organomodified silicones that can be used according to the present invention are silicone oils as defined above and comprise in their structure one or more organofunctional groups attached via a hydrocarbon-based group.

Organopolysiloxanes are defined in greater detail in Walter Noll's *Chemistry and Technology of Silicones* (1968), Academic Press. They may be volatile or non-volatile.

When they are volatile, the silicones are more particularly chosen from those having a boiling point of between 60° C. and 260° C., and even more particularly from:

(i) cyclic polydialkylsiloxanes comprising from 3 to 7 and preferably 4 to 5 silicon atoms. These are, for example, octamethylcyclotetrasiloxane sold in particular under the name Volatile Silicone® 7207 by Union Carbide or Silbione® 70045 V2 by Rhodia, decamethylcyclopentasiloxane sold under the name Volatile Silicone® 7158 by Union Carbide, Silbione® 70045 V5 by Rhodia, and dodecamethylcyclopentasiloxane sold under the name Silsoft 1217 by Momentive Performance Materials, and mixtures thereof. Mention may also be made of cyclocopolymers of the type such as dimethylsiloxane/methylalkylsiloxane, such as Silicone Volatile® FZ 3109 sold by the company Union Carbide, of formula:

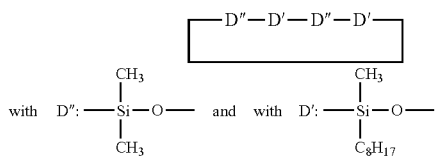

Mention may also be made of mixtures of cyclic polydialkylsiloxanes with organosilicon compounds, such as the mixture of octamethylcyclotetrasiloxane and tetratrimethylsilylpentaerythritol (50/50) and the mixture of octamethylcyclotetrasiloxane and oxy-1,1'-bis(2,2,2',2',3,3'-hexatrimethylsilyloxy)neopentane; and (ii) linear volatile polydialkylsiloxanes containing 2 to 9 silicon atoms and having a viscosity of less than or equal to $5 \times 10^{-6}$ m²/s at 25° C. An example is decamethyltetrasiloxane sold in particular under the name SH 200 by the company Toray Silicone. Silicones belonging to this category are also described in the article published in Cosmetics and Toiletries, Vol. 91, January 1976, pp. 27-32, Todd & Byers, *Volatile Silicone Fluids for Cosmetics*. The viscosity of the silicones is measured at 25° C. according to ASTM standard 445, Appendix C.

Non-volatile polydialkylsiloxanes may also be used. These non-volatile silicones are more particularly chosen from polydialkylsiloxanes, among which mention may be made mainly of polydimethylsiloxanes containing trimethylsilyl end groups.

Among these polydialkylsiloxanes, mention may be made, in a non-limiting manner, of the following commercial products:

the Silbione® oils of the 47 and 70 047 series or the Mirasil® oils sold by Rhodia, for instance the oil 70 047 V 500 000;

the oils of the Mirasil® series sold by the company Rhodia;

the oils of the 200 series from the company Dow Corning, such as DC200 with a viscosity of 60 000 mm²/s; and the Viscasil® oils from General Electric and certain oils of the SF series (SF 96, SF 18) from General Electric.

Mention may also be made of polydimethylsiloxanes containing dimethylsilanol end groups known under the name dimethiconol (CTFA), such as the oils of the 48 series from the company Rhodia.

Among the silicones containing aryl groups, mention may be made of polydiarylsiloxanes, especially polydiphenylsiloxanes and polyalkylarylsiloxanes such as phenyl silicone oil.

The phenyl silicone oil may be chosen from the phenyl silicones of the following formula:

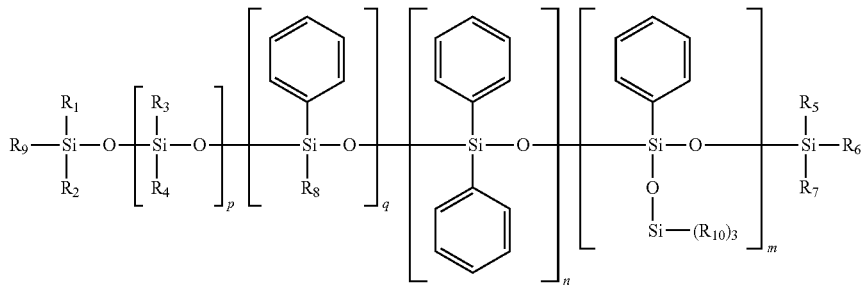

in which
R₁ to R₁₀, independently of each other, are saturated or unsaturated, linear, cyclic or branched $C_1$-$C_{30}$ hydrocarbon-based radicals, preferably $C_1$-$C_{12}$ hydrocarbon-based radicals, and more preferably $C_1$-$C_6$ hydrocarbon-based radicals, in particular methyl, ethyl, propyl or butyl radicals, and m, n, p and q are, independently of each other, integers of 0 to 900 inclusive, preferably 0 to 500 inclusive, and more preferably 0 to 100 inclusive, with the proviso that the sum n+m+q is other than 0.

Examples that may be mentioned include the products sold under the following names:
the Silbione® oils of the 70 641 series from Rhodia;
the oils of the Rhodorsil® 70 633 and 763 series from Rhodia;
the oil Dow Corning 556 Cosmetic Grade Fluid from Dow Corning;
the silicones of the PK series from Bayer, such as the product PK20;
certain oils of the SF series from General Electric, such as SF 1023, SF 1154, SF 1250 and SF 1265.

As the phenyl silicone oil, phenyl trimethicone (R₁ to R₁₀ are methyl; p, q, and n=0; m=1 in the above formula) is preferable.

The organomodified liquid silicones may especially contain polyethyleneoxy and/or polypropyleneoxy groups. Mention may thus be made of the silicone KF-6017 proposed by Shin-Etsu, and the oils Silwet® L722 and L77 from the company Union Carbide.

Hydrocarbon oils may be chosen from:
linear or branched, optionally cyclic, $C_6$-$C_{16}$ lower alkanes. Examples that may be mentioned include hexane, undecane, dodecane, tridecane, and isoparaffins, for instance isohexadecane, isododecane and isodecane; and
linear or branched hydrocarbons containing more than 16 carbon atoms, such as liquid paraffins, liquid petroleum jelly, polydecenes and hydrogenated polyisobutenes such as Parleam®, and squalane.

As preferable examples of hydrocarbon oils, mention may be made of, for example, linear or branched hydrocarbons such as isohexadecane, isododecane, squalane, mineral oil (e.g., liquid paraffin), paraffin, vaseline or petrolatum, naphthalenes, and the like; hydrogenated polyisobutene, isoeicosan, and decene/butene copolymer; and mixtures thereof.

The term "fatty" in the fatty alcohol means the inclusion of a relatively large number of carbon atoms. Thus, alcohols which have 4 or more, preferably 6 or more, and more preferably 12 or more carbon atoms are encompassed within the scope of fatty alcohols. The fatty alcohol may be saturated or unsaturated. The fatty alcohol may be linear or branched.

The fatty alcohol may have the structure R—OH wherein R is chosen from saturated and unsaturated, linear and branched radicals containing from 4 to 40 carbon atoms, preferably from 6 to 30 carbon atoms, and more preferably from 12 to 20 carbon atoms. In at least one embodiment, R may be chosen from $C_{12}$-$C_{20}$ alkyl and $C_{12}$-$C_{20}$ alkenyl groups. R may or may not be substituted with at least one hydroxyl group.

As examples of the fatty alcohol, mention may be made of lauryl alcohol, cetyl alcohol, stearyl alcohol, isostearyl alcohol, behenyl alcohol, undecylenyl alcohol, myristyl alcohol, octyldodecanol, hexyldecanol, oleyl alcohol, linoleyl alcohol, palmitoleyl alcohol, arachidonyl alcohol, erucyl alcohol, and mixtures thereof.

It is preferable that the fatty alcohol be a saturated fatty alcohol.

Thus, the fatty alcohol may be selected from straight or branched, saturated or unsaturated $C_6$-$C_{30}$ alcohols, preferably straight or branched, saturated $C_6$-$C_{30}$ alcohols, and more preferably straight or branched, saturated $C_{12}$-$C_{20}$ alcohols.

The term "saturated fatty alcohol" here means an alcohol having a long aliphatic saturated carbon chain. It is preferable that the saturated fatty alcohol be selected from any linear or branched, saturated $C_6$-$C_{30}$ fatty alcohols. Among the linear or branched, saturated $C_6$-$C_{30}$ fatty alcohols, linear or branched, saturated $C_{12}$-$C_{20}$ fatty alcohols may preferably be used. Any linear or branched, saturated $C_{16}$-$C_{20}$ fatty alcohols may be more preferably used. Branched $C_{16}$-$C_{20}$ fatty alcohols may be even more preferably used.

As examples of saturated fatty alcohols, mention may be made of lauryl alcohol, cetyl alcohol, stearyl alcohol, isostearyl alcohol, behenyl alcohol, undecylenyl alcohol, myristyl alcohol, octyldodecanol, hexyldecanol, and mixtures thereof. In one embodiment, cetyl alcohol, stearyl alcohol, octyldodecanol, hexyldecanol, or a mixture thereof (e.g., cetearyl alcohol) as well as behenyl alcohol, can be used as a saturated fatty alcohol.

According to at least one embodiment, the (c) oil may be selected from ester oils, artificial or natural triglycerides, fatty alcohols, and mixtures thereof.

As the natural triglycerides, mention may be made of plant-extracted oils, plant-extracted butters, and mixtures thereof.

Among the plant-extracted oils, the following may be cited: *jojoba* oil, babassu oil, sunflower oil, olive oil, canola oil, coconut oil, meadowfoam seed oil; Brazil nut oil, marula oil, maize oil, argan oil, soybean oil, marrow oil, grapeseed oil, linseed oil, sesame oil, hazelnut oil, apricot oil, *Macadamia* oil, arara oil, coriander oil, castor oil, avocado oil, shea butter oil, rapeseed oil, corn germ oil, and copra oil.

Among the plant-extracted butters, the following may be cited: shea butter, *nilotica* shea butter (*Butyrospermum parkii*), galam butter (*Butyrospermum parkii*), *borneo* butter or fat or tengkawang tallow (*Shorea stenoptera*), *Shorea* butter, *Illipe* butter, *Madhuca* butter or (*Bassia*) *Madhuca longifolia* butter, mowrah butter (*Madhuca latifolia*), katiau butter (*Madhuca mottleyana*), phulwara butter (*M. butyracea*), mango butter (*Mangifera indica*), murumuru butter (*Astrocaryum murumuru*), kokum butter (*Garcinia indica*), ucuuba butter (*Virola sebifera*), *tucuma* butter, painya (kpangnan) butter (*Pentadesma butyracea*), coffee butter (*Coffea arabica*), apricot butter (*Prunus armeniaca*), *Macadamia* butter (*Macadamia ternifolia*), grapeseed butter (*Vitis vinifera*), avocado butter (*Persea gratissima*), olive butter (*Olea europaea*), sweet almond butter (*Prunus amygdalus dulcis*), cocoa butter (*Theobroma cacao*), and sunflower butter.

Preferably, the natural triglycerides may be selected from corn germ oil, shea butter and mixtures thereof.

The amount of the ingredient (c) in the composition according to the present invention may be 50% by weight or more, preferably 60% by weight or more, and more preferably 70% by weight or more, relative to the total weight of the composition.

On the other hand, the amount of the ingredient (c) in the composition according to the present invention may be 98% by weight or less, preferably 95% by weight or less, and more preferably 90% by weight or less, relative to the total weight of the composition.

The amount of the ingredient (c) in the composition according to the present invention may range from 50% to 98% by weight, preferably from 60% to 95% by weight, more preferably from 70% to 90% by weight, relative to the total weight of the composition.

[Water]

The composition according to the present invention may comprise (d) water.

The composition according to the present invention may comprise water in an amount of less than 5% by weight, preferably less than 3% by weight, and more preferably less than 1% by weight, relative to the total weight of the composition. It is preferable that the composition according to the present invention be anhydrous (including no water).

[Polyglyceryl Fatty Acid Esters with 10 or More Glycerol Units]

The composition according to the present invention may comprise at least one polyglyceryl fatty acid ester having 10 or more glycerol units.

The composition according to the present invention may comprise at least one polyglyceryl fatty acid ester having 10 or more glycerol units in an amount of less than 5% by weight, preferably less than 3% by weight, more preferably less than 1% by weight, and even more preferably less than 0.1% by weight, relative to the total weight of the composition. It is preferable that the composition according to the present invention comprise no polyglyceryl fatty acid ester having 10 or more glycerol units.

[PEG-Based Surfactant]

The composition according to the present invention may comprise at least one surfactant having at least one polyoxyethylene unit.

The composition according to the present invention may comprise at least one surfactant having at least one polyoxyethylene unit in an amount of less than 5% by weight, preferably less than 3% by weight, more preferably less than 1% by weight, and even more preferably less than 0.1% by weight, relative to the total weight of the composition. It is preferable that the composition according to the present invention comprise no surfactant having at least one polyoxyethylene unit.

[Other Ingredients]

The composition according to the present invention may also include at least one optional or additional ingredient.

The amount of the optional or additional ingredient(s) is not limited, but may be from 0.01% to 30% by weight, preferably from 0.1% to 20% by weight, and more preferably from 1% to 10% by weight, relative to the total weight of the composition according to the present invention.

The optional or additional ingredient(s) may be selected from the group consisting of anionic, cationic, nonionic or amphoteric polymers; thickeners; suspending agents; sequestering agents; opacifying agents; dyes; vitamins or provitamins; fragrances; preservatives, co-preservatives, stabilizers; and mixtures thereof.

(Preparation)

The composition according to the present invention can be prepared by mixing the essential ingredient(s) as explained above, and optional ingredient(s), if necessary, as explained above.

The method and means to mix the above essential and optional ingredients are not limited. Any conventional method and means can be used to mix the above essential and optional ingredients to prepare the composition according to the present invention.

[Structure and Form]

The structure of the composition according to the present invention is not particularly limited.

It is preferable that the composition according to the present invention be in the form of a solution, in particular a reverse micelle solution comprising dispersed phases including the ingredient (a) and/or the ingredient (b) in a continuous oil phase. In the reverse micelle solution, the ingredient (a) and/or the ingredient (b) preferably form reverse micelles.

In case water is further comprised, the composition according to the present invention may be in the form of a micro-emulsion, in particular a reverse micro-emulsion comprising dispersed phases including the ingredient (a) and/or the ingredient (b) as well as water in a continuous oil phase.

In the reverse micro-emulsion, the ingredient (a) and/or the ingredient (b) preferably form reverse micelles including water. The dispersed phases can be in the form of droplets in the oil phase.

The "micro-emulsion" may be defined in two ways, namely, in a broad sense and in a narrow sense. That is to say, there is the one case ("micro-emulsion in the narrow sense") in which the micro-emulsion refers to a thermodynamically stable isotropic single liquid phase containing a ternary system having three ingredients of an oily component, an aqueous component and a surfactant, and there is the other case ("micro-emulsion in the broad sense") in which among thermodynamically unstable typical emulsion systems the micro-emulsion additionally includes those such emulsions presenting transparent or translucent appearances due to their smaller particle sizes (Satoshi Tomomasa, et al., Oil Chemistry, Vol. 37, No. 11 (1988), pp. 48-53). The "micro-emulsion" as used herein refers to a "micro-emulsion in the narrow sense", i.e., a thermodynamically stable isotropic single liquid phase.

The micro-emulsion may have a dispersed phase with a particle size of 100 nm or less, preferably 50 nm or less, and more preferably 20 nm or less, measured by laser granulometry. The particle size can be measured by a dynamic light scattering method. The particle size measurement can be performed by, for example, the Particle Size Analyzer ELSZ-2000 series, marketed by Otsuka Electronics Co., Ltd.

The particle size can be a volume-average particle diameter or a number-average particle diameter, preferably a volume-average particle diameter.

The composition according to the present invention may be transparent.

The form of the composition according to the present invention is not particularly limited, and may take various forms such as an oily liquid, an oily gel, an oily stick, or the like.

[Process and Use]

It is preferable that the composition according to the present invention be a cosmetic composition, and more preferably a cleansing cosmetic composition. It is even more preferable that the composition according to the present invention be intended for removing makeup from a keratin substance, e.g., skin (in particular the face), hair, mucous membranes such as the lips, nails, eyelashes, eyebrows and/or scalp.

The composition according to the present invention can be used for a non-therapeutic process, such as a cosmetic process, for treating a keratin substance, e.g., skin (in particular the face), hair, mucous membranes such as the lips, nails, eyelashes, eyebrows and/or scalp, by being applied to the keratin substance.

Thus, the present invention also relates to a cosmetic process for treating a keratin substance e.g., skin (in particular the face), hair, mucous membranes such as the lips, nails, eyelashes, eyebrows and/or scalp, comprising the step of applying the composition according to the present invention to the keratin substance.

The above process may further comprise the step of rinsing off the composition from the keratin substance, wherein the process is intended for removing makeup from the keratin substance.

The cosmetic process according to the present invention can provide sufficient makeup removability and a comfortable feeling just after being rinsed off, such as a refreshed feeling.

The present invention may also relate to a use of a combination of (a) at least one polyglycerol fatty acid diester and/or at least one polyglyceryl fatty acid triester, wherein the ingredient (a) comprises a fatty acid moiety with 6 to 22 carbon atoms, preferably 7 to 20 carbon atoms, and more preferably 8 to 18 carbon atoms, and less than 10 glycerol units, preferably 8 or less, and more preferably 6 or less, and (b) at least one polyglycerol fatty acid monoester, wherein the ingredient (b) comprises a fatty acid moiety with 6 to 22 carbon atoms, preferably 7 to 20 carbon atoms, and more preferably 8 to 18 carbon atoms, and less than 10 glycerol units, preferably 8 or less, and more preferably 6 or less in a composition including (c) at least one oil under the condition that the average HLB value of the ingredients (a) and (b) is from 8.0 to 11.0, preferably from 8.5 to 10.5, and more preferably from 9.0 to 10.0 in order to improve at least one, preferably all, of the makeup removability of the composition, the feeling (skin finish) after using the composition (especially just after being used), and the stability of the composition.

The above explanations regarding the ingredients (a) to (c), as well as the optional ingredients, for the composition according to the present invention can apply to those for the process and use according to the present invention.

EXAMPLES

The present invention will be described in more detail by way of examples which however should not be construed as limiting the scope of the present invention.

Examples 1-8 and Comparative Examples 1-3

The following compositions according to Examples 1-8 and Comparative Examples 1-3, shown in Table 1, were prepared by mixing the components shown in Table 1 as follows:

(1) mixing the ingredients of Phase A at about 70° C. to form a uniform mixture of Phase A ingredients;
(2) mixing the ingredients of Phase B at about 70° C. to form a uniform mixture of Phase B ingredients;
(3) further mixing the mixture of Phase A ingredients and the mixture of Phase B ingredients;
(4) cooling the mixture of Phase A and Phase B ingredients to room temperature to form a composition; and
(5) if necessary, further mixing the ingredient of Phase C.

The numerical values for the amounts of the components shown in Table 1 are all based on "% by weight" as active raw materials.

| | Ingredients | HLB | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 |
|---|---|---|---|---|---|---|---|---|---|---|---|---|---|
| A | (a) PG-6 Dioleate* | 9.8 | 4 | 3.5 | 3.5 | 4 | 5.5 | 2 | 2 | 5 | 1.5 | 2.5 | — |
| | (a) PG-6 Dicaprate* | 10.2 | 4 | 3.5 | 4 | — | 2 | 5.5 | 5.5 | 1 | 1 | 3 | 10 |
| | (a) PG-6 Tricaprylate* | 10.6 | — | — | — | 3.5 | — | — | — | — | — | — | — |
| | (b) PG-2 Oleate* | 7.2 | 2 | 2 | 2 | 2.5 | 2 | 2 | 2 | 4 | 7.5 | 1 | — |
| | (b) PG-6 Caprylate* | 14.6 | — | — | — | — | 0.5 | 0.15 | 0.15 | — | — | 3.5 | — |
| | (b) PG-5 Laurate* | 10.9 | — | 1 | — | — | — | — | — | — | — | — | — |
| | (b) PG-5 Oleate* | 12.7 | — | — | 0.5 | — | — | — | — | — | — | — | — |
| B | (c) Isopropyl Myristate | | 12 | 12 | 12 | 12 | 8 | 8 | 8 | 8 | 12 | 12 | 12 |
| | (c) Caprylic/Capric Triglyceride | | 20 | 20 | 20 | 10 | — | — | — | — | 20 | 20 | 20 |
| | (c) Ethylhexyl Palmitate | | 28 | 28 | 28 | 25 | 25 | 25 | 25 | 25 | 28 | 28 | 28 |

-continued

| Ingredients | HLB | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 |
|---|---|---|---|---|---|---|---|---|---|---|---|---|
| (c) Corn Germ Oil | | — | — | — | 30 | 50 | 50.35 | 49.55 | 50 | — | — | — |
| (c) Caprylic/Capric Succinic Triglyceride | | 25 | 25 | 25 | — | 7 | 7 | 7 | 7 | 25 | 25 | 25 |
| (c) Ethylhexyl Stearate | | 5 | 5 | 5 | — | — | — | — | — | 5 | 5 | 5 |
| (c) Octyldodecanol | | — | — | — | 5 | — | — | — | — | — | — | — |
| (c) Shea Butter | | — | — | — | 8 | — | — | — | — | — | — | — |
| C (d) Water | | — | — | — | — | — | — | 0.8 | — | — | — | — |
| Average HLB | | 9.44 | 9.53 | 9.59 | 9.43 | 9.60 | 9.56 | 9.56 | 8.80 | 7.89 | 11.34 | 10.20 |
| Makeup Removability | | Excellent | Excellent | Excellent | Excellent | Excellent | Excellent | Excellent | Excellent | Excellent | Poor | Good |
| Makeup Removability (wet-use condition) | | Excellent | Excellent | Excellent | Excellent | Excellent | Excellent | Excellent | Poor | Poor | Poor | Poor |
| Weight Ratio of (b)/(a) | | 0.25 | 0.43 | 0.33 | 0.33 | 0.33 | 0.29 | 0.29 | 0.67 | 3.00 | 0.82 | — |
| Feeling After Rinsing Off | | Excellent | Excellent | Excellent | Excellent | Excellent | Excellent | Excellent | Good | Poor | Excellent | Good |
| Stability | | Excellent | Excellent | Excellent | Excellent | Excellent | Excellent | Excellent | Excellent | Excellent | Very Poor | Poor |

*readily biodegradable in accordance with the OECD 301C testing methodology

[Evaluations]

(Makeup Removability)

Each of 5 panelists made-up their faces by applying a liquid foundation product (0.5 mL for the whole face, MAYBELLINE Super Mineral Liquid Long Keep OC2: Ocher 2) to the skin of the face and a mascara product (MAYBELLINE Volum'Express Hypercurl Waterproof N 01 Black) to the eyelashes with a brush with a total of 40 strokes (each time, the brush was dipped into the mascara bottle).

*For wet-use conditions only, before applying the make-up, the following steps were performed:

(1) holding a spray bottle including water at a position 10 cm away from the face;
(2) spraying water 4 times (1 spray=about 0.13 mL) on half of the face (8 times for the whole face); and
(3) (before removing the make-up) putting 1.0 ml of water on the palms and wetting the palms (half palm: 0.5 mL).

4 mL of each composition was then applied onto the face by the fingers, and massaged with a circular gesture on the whole face for 30 seconds and on the eye area for 10 seconds. Finally, the composition was rinsed off from the whole face, in particular the eye area, with lukewarm water. The panelists evaluated the makeup removability with a grade of from 1 (very poor) to 5 (excellent), and the average of the evaluations was categorized in accordance with the following criteria.

Excellent (5.0 to 4.0): A makeup residue was not observed at all.

Good (3.9 to 3.0): A makeup residue was mostly not observed.

Poor (2.9 to 2.0): A makeup residue was slightly observed.

Very Poor (1.9 to 1.0): A makeup residue was visibly observed.

The results are shown in Table 1.

(Feeling after Rinsing Off)

Each of 5 panelists made-up their faces by applying a liquid foundation product (0.5 mL for the whole face, MAYBELLINE Super Mineral Liquid Long Keep OC2: Ocher 2) to the skin of the face and a mascara product (MAYBELLINE Volum'Express Hypercurl Waterproof N 01 Black) to the eyelashes with a brush with a total of 40 strokes (each time, the brush was dipped into the mascara bottle).

4 mL of each composition was then applied onto the face by the fingers, and massaged with a circular gesture on the whole face for 30 seconds and on the eye area for 10 seconds. Finally, the composition was rinsed off from the whole face, in particular the eye area, with lukewarm water. The panelists evaluated the feeling just after rinsing off (skin finish) with a grade of from 1 (very poor) to 5 (excellent), and the average of the evaluations was categorized in accordance with the following criteria.

Excellent (5.0 to 4.0): A very refreshed feeling was felt after rinsing off.

Good: (3.9 to 3.0): A refreshed feeling was felt after rinsing off.

Poor (2.9 to 2.0): A somewhat refreshed feeling was felt after rinsing off. Rather, either a greasy or dry feeling was only slightly felt.

Very Poor (1.9 to 1.0): No refreshed feeling was felt after rinsing off. Rather, either a greasy or dry feeling was felt.

The results are shown in Table 1.

(Stability)

Each composition was filled into a transparent glass bottle, and was held under temperature conditions of −5° C., 4° C., 25° C., 40° C., 45° C., and 50° C. for 2 months. Each composition was then checked in terms of transparency, color, and odor, and evaluated in accordance with the following criteria.

Excellent: Almost the same conditions as production.

Good: Small changes in transparency, color, and odor were observed.

Poor: Changes in transparency, color, and odor were clearly observed. Either precipitation or a turbid aspect was also clearly observed.

Very Poor: Changes in transparency, color, and odor were remarkably observed. Either precipitation or a turbid aspect was also remarkably observed.

The results are shown in Table 1.

Examples 1-8 show that the use of a combination of the (a) polyglyceryl fatty acid diester or triester and the (b) polyglyceryl fatty acid monoester can provide a stable composition which has excellent makeup removability and can provide an excellent feeling just after rinsing off, in particular a refreshed feeling.

The comparison of Examples 1-7 with Example 8 will demonstrate that, if the weight ratio of the (b) polyglyceryl fatty acid monoester(s)/the (a) polyglyceryl fatty acid diester(s) or triester(s) is 0.55 or less, preferably 0.50 or less, and more preferably 0.45 or less, an excellent makeup removability can be exerted even under wet conditions.

Comparative Example 1 shows that if the average HLB value of the (a) polyglyceryl fatty acid diester(s) or triester(s) and the (b) polyglyceryl fatty acid monoester(s) is less than 8.0, the feeling just after rinsing off deteriorates.

Comparative Example 2 shows that if the average HLB value of the (a) polyglyceryl fatty acid diester(s) or triester(s) and the (b) polyglyceryl fatty acid monoester(s) is more than 11.0, makeup removability deteriorates, and stability becomes very poor.

Comparative Example 3 shows that if the (b) polyglyceryl fatty acid monoester(s) is not used, stability becomes poor.

The invention claimed is:

1. A composition comprising:
    (a) at least one polyglyceryl fatty acid diester and/or at least one polyglyceryl fatty acid triester;
    (b) at least one polyglyceryl fatty acid monoester; and
    (c) at least one oil,
    wherein
    the ingredients (a) and (b) comprise
        a fatty acid moiety with 6 to 22 carbon atoms, and less than 10 glycerol units,
    a weighted average HLB value of the ingredients (a) and (b) ranges from 8.0 to 11.0,
    a weight ratio of an amount of the ingredient (b) to an amount of the ingredient (a) is from 0.25 to 0.67,
    an amount of the ingredient (c) in the composition ranges from 50% to 98% by weight, and
    the composition comprises no polyglyceryl fatty acid ester having 10 or more glycerol units, or comprises polyglyceryl fatty acid ester having 10 or more glycerol units in an amount of less than 5% by weight, relative to a total weight of the composition.

2. The composition according to claim 1, wherein the ingredient (a) is selected from the group consisting of PG-6 dioleate, PG-6 dicaprate, PG-6 tricaprylate, and mixtures thereof.

3. The composition according to claim 1, wherein the amount of the ingredient (a) in the composition ranges from 0.01% to 20% by weight, relative to the total weight of the composition.

4. The composition according to claim 1, wherein the ingredient (b) is selected from the group consisting of PG-2 oleate, PG-6 caprylate, PG-5 laurate, PG-5 oleate, PG-2 caprate, and mixtures thereof.

5. The composition according to claim 1, wherein the amount of the ingredient (b) in the composition ranges from 0.01% to 20% by weight, relative to the total weight of the composition.

6. The composition according to claim 1, wherein the ingredient (c) is selected from ester oils, artificial or natural triglycerides, fatty alcohol, and mixtures thereof.

7. The composition according to claim 1, wherein the amount of the ingredient (c) in the composition ranges from 60% to 95% by weight, relative to the total weight of the composition.

8. The composition according to claim 1, wherein the composition is anhydrous or comprises water in an amount of less than 5% by weight, relative to the total weight of the composition.

9. The composition according to claim 1, wherein the composition comprises no surfactant having at least one polyoxyethylene unit or comprises surfactant having at least one polyoxyethylene unit in an amount of less than 5% by weight, relative to the total weight of the composition.

10. The composition according to claim 1, wherein the composition is intended for removing makeup from a keratin substance.

11. A cosmetic process for treating a keratin substance, comprising applying the composition according to claim 1 to the keratin substance, further comprising rinsing off the composition from the keratin substance, and wherein the process is intended for removing makeup from the keratin substance.

12. The composition according to claim 1, wherein the composition comprises no polyglyceryl fatty acid ester having 10 or more glycerol units.

* * * * *